No. 795,462. PATENTED JULY 25, 1905.
W. A. TURBAYNE.
ELECTRIC CONTROL APPARATUS.
APPLICATION FILED SEPT. 15, 1904.
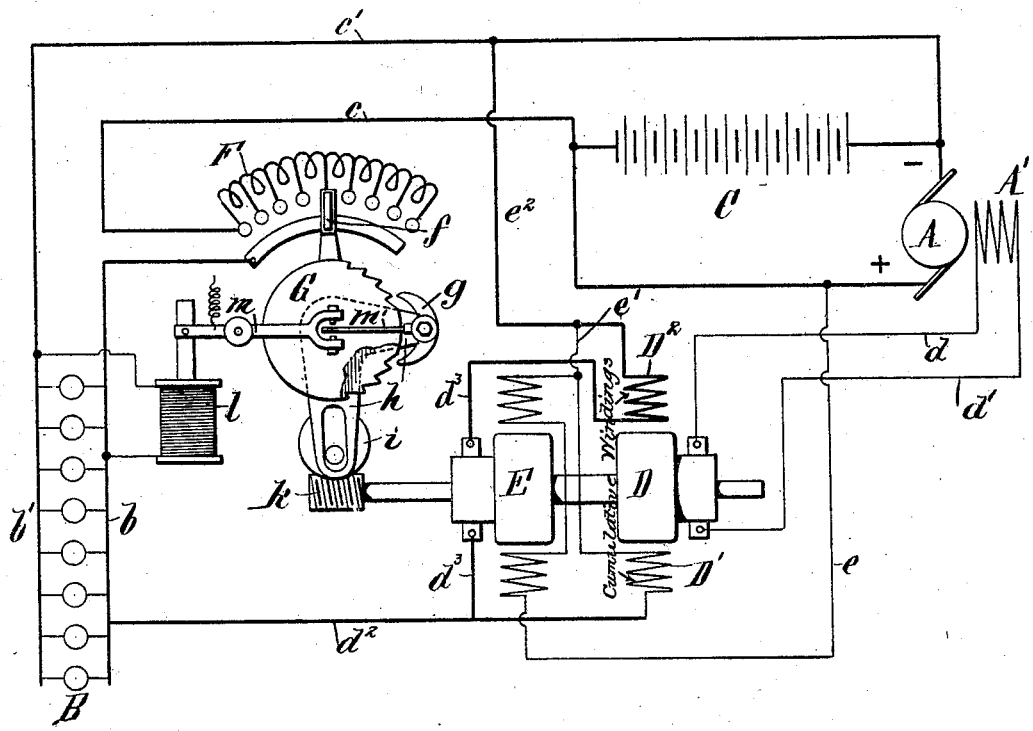
Witnesses:
E. A. Volk.
Inventor
Wm. A. Turbayne,
by Wilhelm, Parker & Hard,
Attorneys.

UNITED STATES PATENT OFFICE.

WILLIAM A. TURBAYNE, OF LANCASTER, NEW YORK, ASSIGNOR TO GOULD COUPLER COMPANY, OF NEW YORK, N. Y.

ELECTRIC-CONTROL APPARATUS.

No. 795,462.　　　　Specification of Letters Patent.　　　　Patented July 25, 1905.

Application filed September 15, 1904. Serial No. 224,504.

*To all whom it may concern:*

Be it known that I, WILLIAM A. TURBAYNE, a citizen of the United States, residing at Lancaster, in the county of Erie and State of New York, have invented a new and useful Improvement in Electric-Control Apparatus, of which the following is a specification.

This invention relates to apparatus for controlling electric currents in systems in which the field-magnet windings of a dynamo are energized by a separate exciting-dynamo which is driven by an electric motor.

The object of the invention is to utilize the electric motor which drives the exciting-dynamo for other duties in such a manner that any speed reduction due to the added load on the motor will not be accompanied by a falling off of the exciter electromotive force.

A further object is to compensate for variations in brush or bearing friction in such manner that any added load which tends to retard the motor speed will not affect the exciter output.

In United States Patent No. 757,695, granted to me April 19, 1904, a system is shown in which such a motor-driven exciter is shown for controlling the main generator excitation, and for such purpose a comparatively small exciting dynamo and motor are used. Ordinarily any additional work thrown on the driving-motor would result in a variation in its speed, and therefore in the electromotive force of the exciter driven thereby. To counteract such variation due to speed retardation, I have provided a special winding on the exciter which will augment its excitation concurrently with any decrease of its speed due to added load on the motor, and thus maintain a practically constant voltage from the exciter-dynamo, so that its fluctuations in speed will not appreciably affect the excitation of the main generator.

The accompanying drawing illustrates diagrammatically an electrical system provided with controlling means embodying the invention.

A represents a dynamo or main generator, A' its field-windings, and B translating devices—such, for example, as incandescent lamps—connected across the work-circuit $b\ b'$, which is fed by the main generator through the generator or external circuit $c\ c'$.

C represents a storage battery, which is charged by the main generator and serves to supply the system when the main generator is out of action or is not producing the required voltage. The battery while not a necessary adjunct to the invention is here shown as indicating with the main generator a source of variable electromotive force feeding a work-circuit wherein regulation to constant electromotive force must be effected.

The field-windings A' of the main generator are connected, as by conductors $d\ d'$, to and are energized by the current from an exciter-dynamo D, whose armature is connected to and driven by a motor E. The field-windings of the exciter-dynamo D and the armature of the motor E are supplied from a source of practically constant electromotive force—for instance, the work-circuit, as shown in the drawings—and the field-windings of the motor are supplied from some suitable source of current, which conveniently may be, but is not necessarily, the main generator. In the system shown in the drawings the motor field-windings are connected across the main generator and battery by conductors $e\ e'\ e^2$.

The field-magnet of the exciter-dynamo has a winding D', which is connected in shunt across the work-circuit, as by a conductor $d^2$ and the conductors $e'\ e^2$, and in addition to this shunt-winding has another or supplemental field-winding $D^2$, which acts cumulatively with the shunt-winding D' and is connected in series with the armature of the motor E across the work-circuit, as by conductors $d^2$, $d^3$, and $e^2$. These field-windings of the exciter-dynamo and the armature of the motor can be connected to any other practically constant source.

A constant electromotive force is maintained across the work-circuit by any known or suitable means, (represented conventionally at F.) The means illustrated consists of a resistance device or rheostat having a movable contact-arm $f$, actuated by suitable electromechanical means—such, for instance, as follows: The rheostat-arm is connected to a ratchet-wheel G, which is provided with oppositely-disposed teeth and is moved intermittently in either direction to shift the rheostat-arm from one to the other of the rheostat-contacts by a double-ended pawl $g$, carried by a pawl-lever $h$, which is continuously oscillated by a crank-wheel $i$, driven by the motor through intermediate worm or other gearing $k$. The double pawl $g$ is normally held in a neutral position with both ends out of engagement with the ratchet-wheel teeth by a solenoid $l$, whose core is connected by a lever $m$ and stem or arm $m'$ to the pawl. When the voltage of the work-circuit rises or falls above or below the desired constant value, the solenoid-core is moved in one or the other direction and the pawl is tilted on the pawl-lever so as to throw one or the other of its ends in operative relation to the ratchet-wheel teeth, and thus move the latter and the rheostat-arm to introduce or withdraw resistance into or from the work-circuit.

The resistance device illustrated and described is selected simply as an example, and the invention is in no wise limited to any particular type of resistance device or mechanism for operating it.

The magnetic circuit of the exciter-dynamo D is energized by the joint and cumulative effect of its shunt-winding $D'$, which is traversed by a practically constant current, and the series winding $D^2$, which is traversed by the current of the motor-armature, and as this current through the armature will rise in proportion to the force which tends to retard the motion of the motor it follows that when the motor is required to perform the additional work of shifting the rheostat-arm the excitation of the field of the exciter-dynamo is augmented, so that any retardation in the speed of the motor and the exciter-dynamo driven thereby is accompanied by a corresponding rise in the excitation of the field of the exciter-dynamo, and the output of the latter will remain practically constant regardless of the changes in the load on and the speed of the motor.

The operation of the apparatus is as follows: The motor E drives the exciter-dynamo D and also continuously oscillates the pawl-lever $h$ of the regulating device, the pawl $g$ being normally held in its neutral or inactive position and the ratchet-wheel G and rheostat-arm $f$ remaining stationary. In the event of a change of voltage in the work-circuit, caused, for example, by adding or removing lamp-load, the regulator-solenoid $l$ will be influenced and will shift the pawl $g$ and cause the intermittent movement of the ratchet-wheel and rheostat-arm to introduce resistance into or withdraw resistance from the work-circuit, depending upon the rise or fall of the voltage of the latter. The work of shifting the rheostat-arm $f$ tends to retard the speed of the motor and exciter-dynamo; but as such decreased speed in these latter is accompanied by an increased magnetization of the field of the exciter-dynamo D, as before explained, its output remains practically constant, and such fluctuations in speed of the motor do not produce an appreciable effect in the excitation of the main generator.

I claim as my invention—

1. The combination of a main generator, a circuit, an exciter apparatus for the field-magnet of the main generator, a regulating device for said circuit actuated by said exciter apparatus; and means for varying the excitation of said exciter apparatus in accordance with variations in load thereon, substantially as set forth.

2. The combination of a main generator, a circuit fed thereby, an exciter apparatus for the field-magnet of the main generator, a regulating device for said circuit actuated by said exciter apparatus, and means for varying the excitation of said exciter apparatus upon a variation in the speed thereof, substantially as set forth.

3. The combination of a main generator, a circuit fed thereby, an exciter-dynamo for the field-magnet of the main generator, a motor for driving said exciter-dynamo, a device operated by said motor for regulating the voltage of said circuit, and means for varying the field excitation of said exciter-dynamo upon a variation in the speed of said motor, substantially as set forth.

4. The combination of a main generator, a circuit, an exciter-dynamo for the field-magnet of the main generator, a motor for driving said exciter-dynamo, a device operated by said motor for regulating the voltage of said circuit, said exciter-dynamo having a field-magnet winding connected in series with said motor-armature whereby a variation in speed of said motor will cause a variation in excitation of the field-magnet of said exciter-dynamo, substantially as set forth.

5. The combination of a main generator, a circuit fed thereby, an exciter-dynamo for the field-magnet of the main generator, a motor for driving said exciter-dynamo, said motor-armature and said exciter-dynamo field having windings connected to a source or sources of practically constant voltage, and said exciter-dynamo having a field-winding connected in series with said motor-armature, and a device operated by said motor for controlling the voltage of said circuit, substantially as set forth.

Witness my hand this 8th day of September, 1904.

WILLIAM A. TURBAYNE.

Witnesses:
CHAS. W. PARKER,
EDWARD C. HARD.